W. E. BEEMAN.
DEMOUNTABLE RIM.
APPLICATION FILED DEC. 29, 1921.
1,423,176.
Patented July 18, 1922.
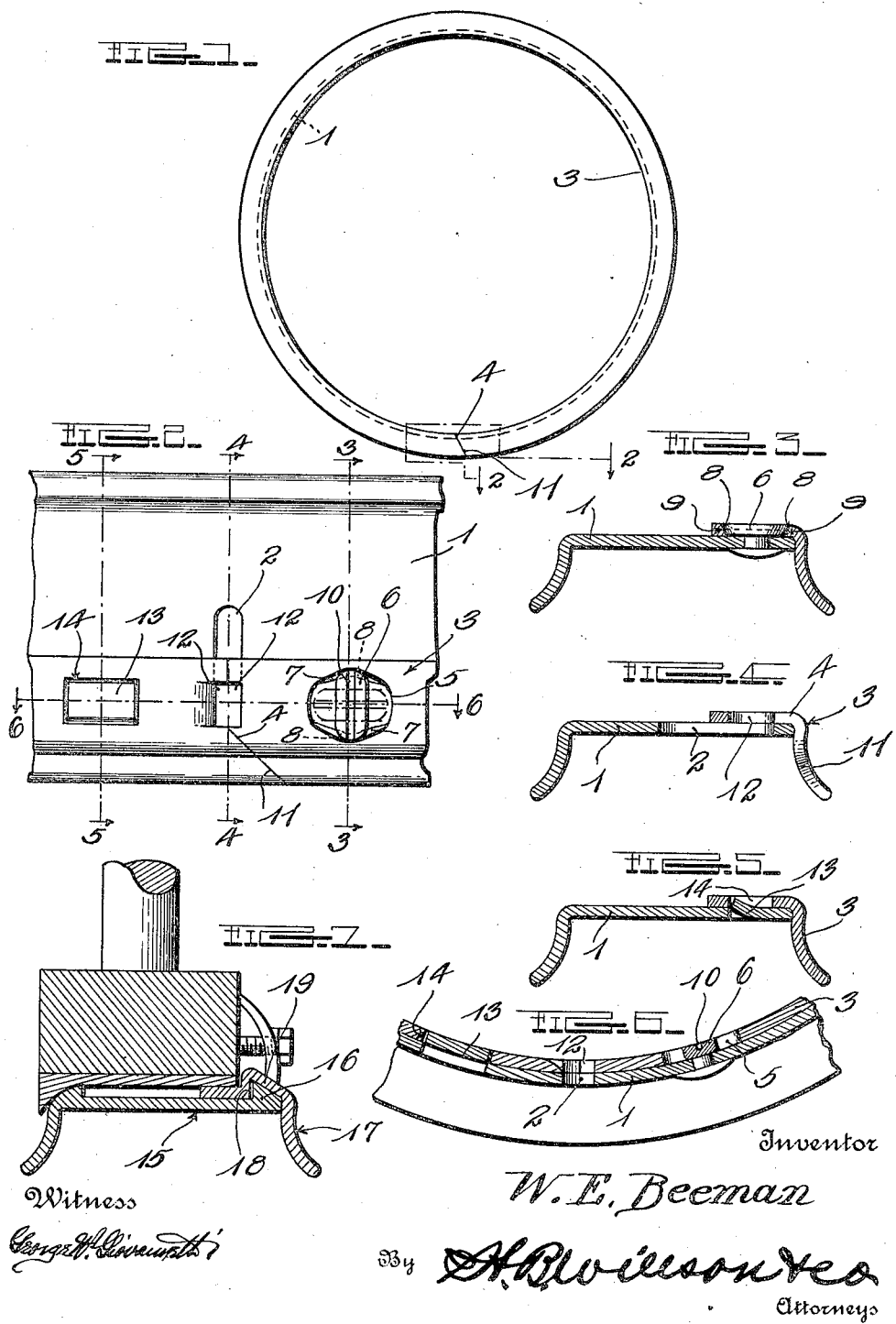

UNITED STATES PATENT OFFICE.

WALTER E. BEEMAN, OF LAPORTE, INDIANA.

DEMOUNTABLE RIM.

1,423,176.                      Specification of Letters Patent.      Patented July 18, 1922.

Application filed December 29, 1921. Serial No. 525,552.

*To all whom it may concern:*

Be it known that I, WALTER E. BEEMAN, a citizen of the United States, residing at Laporte, in the county of Laporte and State of Indiana, have invented certain new and useful Improvements in Demountable Rims; and I do declare the following to be a full, clear, and exact description of the invention, such as will enable others skilled in the art to which it appertains to make and use the same.

This invention relates to an improved demountable rim for automobile wheels, and it has for its principal object to generally improve upon rims of this class by providing one of extreme simplicity and durability, which is such in construction that it greatly facilitates application and removal of a pneumatic tire.

Another and important object of the invention is to provide a rim of this class embodying an endless flanged section together with a transversely split resilient section adapted to telescopically engage the endless section, the abutting ends of the split being beveled so that by simply providing means for holding the overlying beveled end in place, the remaining end will also be held in place.

Another feature and object of the invention is to provide a demountable rim embodying the aforesaid construction, there being notches formed in the abutting ends of the split rim section which when brought together provide an opening to permit insertion of a suitable implement for disengaging the split ends when the retaining means is released, whereby the split rim section because of its inherent resiliency will automatically contract so as to permit it to be easily and readily separated from the endless rim section.

A still further and important feature of the invention is to arrange the split and implement inserting opening opposite the notch in the base portion of the endless section which serves to accommodate the valve stem of the tire, whereby this notch will act in conjunction with the opening to permit the implement to be inserted a sufficient distance to insure easy disengagement of the abutting ends.

Other objects and advantages of the invention will be apparent during the course of the following description.

In the accompanying drawings forming a part of this specification and in which like numerals are employed to designate like parts throughout the same:

Figure 1 is a side elevational view of a demountable rim constructed in accordance with this invention.

Figure 2 is an enlarged top plan view of a portion of the rim sections showing the unique securing means more clearly.

Figures 3, 4 and 5 are transverse sections taken substantially on the planes of the lines 3—3, 4—4 and 5—5 respectively of Fig. 2.

Figure 6 is a longitudinal section taken on the line 6—6 of Fig. 2.

Figure 7 is a transverse section through a slightly modified type of rim showing the same applied on an automobile wheel.

Referring to the drawings in detail, it will be seen that the improved rim comprises an endless flanged section 1 provided with the usual elongated notch 2 for accommodating the tire valve. Telescoping into the rim section is a relatively small split section 3 whose inherent resiliency is such as to cause it to automatically contract when the abutting beveled ends 4 are disengaged. Inasmuch as it is the normal tendency of the split rim section to automatically decrease its diameter, means must necessarily be employed for connecting it to the rim section 1 and preventing contraction during the course of travel when the rim is on an automobile wheel. By beveling the ends 4 of the split rim section, it is only necessary to provide means for connecting one end of the section, adjacent the split, with the base or ring-like portion of the endless section. The means in its preferred form comprises an elongated slot 5 formed in the ring-like part of the section 3, together with a rotary turn-button or fastener 6 carried by the rim section 1 and having its elongated head arranged in this slot. By carefully examining the slot 5, it will be seen that the opposed side walls are beveled as indicated at 7 and are formed with oppositely disposed seats 8. It will also be noted that the head of the rotary turn-button is of less length than the slot and has its opposite ends beveled as at 9 for co-action with the beveled walls of the slot. It is obvious that in order to effect a locking action, it is only necessary to place a screw-driver or the like in the kerf 10 formed in the head of the rotary turn-button and to turn the latter crosswise of the slot 5 so that its ends are positioned in the seats 8. For the sake of clearness of the description, that end of the split section which is secured to the remaining section will be referred to as the overlying beveled end. By referring to Fig. 2, it will be seen that the split is not straight but the outer portion thereof is diagonal or inclined as shown at 11. On opposite sides of the straight portion of the split, the beveled ends are formed with notches 12 which when brought together provide a substantially rectangular opening to permit insertion of a screw-driver or the like for disengaging the abutting ends. It is to be noted, as before indicated, that this screw-driver inserting opening and straight portion of the split is disposed opposite the aforesaid valve notch 2 so as to provide additional space for the end of the screw-driver.

The means so far described for partially connecting the rim sections together is insufficient to effectively accomplish this end and I therefore employ additional means for acting in conjunction therewith. The means last referred to comprises a number of circumferentially spaced tongues 13 struck inwardly from the base portion of the rim section 1, these tongues being adapted to extend into rectangular openings 14 formed in the corresponding portion of the split rim section and adapted to be registered therewith as shown clearly in Fig. 5 to prevent transverse separation of the portions of the rim sections remote from the split ends.

The operation of the rim is as follows: Assuming that the rim sections are secured together as illustrated in the drawings and further assuming that it is desired to either apply or remove the tire, it will be seen that by making use of a screw-driver or the like and inserting the end through the opening formed by the notches 12, the beveled ends 4 of the split rim section can be disengaged by simply prying them loose. Of course, prior to this, it is necessary to turn the head of the button 6 from the position shown in full lines in Fig. 2 to the dotted line position. As soon as the beveled ends are thus disengaged, the inherent resiliency of the split ring causes it to automatically assume a smaller diameter, whereby to permit it to be easily separated from the endless section 1. It therefore follows that if the tire is in place on the last named section, it can be easily removed. In connecting the rim sections, the operation is the reverse of that described. It may be added that in order to insure effective results in assembling the rim sections, it will be well to place the flanged side of the endless rim section down on the ground or floor so that the operation can be easily accomplished. It is of course understood that the usual removable lugs are connected with the periphery of the automobile wheel for maintaining the demountable rim in place on the latter.

It is not desired to restrict the invention to the particular form of openings and tongues 13 and 14 for maintaining the rim sections against transverse separation and I therefore direct attention at this point to Fig. 7 wherein I have disclosed a slightly modified form of the rim. In this figure, the numeral 15 designates the flanged endless section which is equipped on the inner periphery of its base portion adjacent the outer edge, with a beveled rib or bead 16 which extends entirely around this portion except for the break at the valve notch. It is of course understood that the rib need not be endless or substantialy so, but may be in the form of a number of spaced beveled projections. With this construction of solid rim section, it is necessary that the split rim section 17 have its ring-like or base portion angularly shaped in cross-section as indicated at 18 for coaction with the inner vertical face of the rib, the remaining parts 19 being shaped for coaction with the beveled inner face of the same. Other than these details, the rim sections are constructed in exactly the same maner as those hereinbefore described. That is, these rim sections are also provided with the split beveled ends and same fastening means for these ends as hereinbefore described in detail and clearly illustrated in Fig. 2. The fastening means disclosed in Fig. 7 is simply intended to take the place of the tongues and openings 13 and 14 described in the first form of the invention. The manner of assembling or disassembling this form of rim is exactly as above described.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A demountable rim comprising an endless flanged section, a flanged self-contracting transversely split section telescoping within the first named section, the abutting ends of said split section being beveled and overlapping one another, and co-acting means between the endless section and one end of the split section for maintaining the ends in engagement with one another and for connecting the two sections together.

2. A demountable automobile rim comprising a pair of telescopically engaged rim sections, one of said sections being self-contractible and being transversely split, said split ends being beveled, and means for maintaining said beveled ends in engagement with one another comprising an elongated slot and a fastener designed to extend crosswise of the slot when effective.

3. A demountable automobile rim comprising a pair of flanged rim sections, one of said sections being transversely split and telescoping into the other section, said split section being formed adjacent the split with an elongated slot, the other rim section being equipped with a rotary fastener including a head adapted to extend crosswise of said slot to partially hold the sections together, and additional means for assisting in holding the sections together against transverse separation.

4. A demountable automobile rim comprising a pair of telescopically engaged flanged sections, one of said sections being formed in its base with a notch to accommodate the tire valve, the remaining section being formed opposite this notch with a transverse split and the split ends being beveled and engaged with one another, said beveled ends being formed with oppositely disposed notches which when brought together form an opening for insertion of an implement to disengage the beveled ends, said opening being disposed opposite said valve notch to provide additional space to insure effective engagement of the implement with one of the beveled ends, and means for connecting said sections together and said beveled ends in engagement with one another.

5. A demountable rim including a resilient flanged section provided with a transverse split, the split ends being beveled for engagement with one another, the base portion of said section being formed with a plurality of circumferentially spaced elongated slots, one of the slots adjacent said split being widened intermediate its ends to provide seats and the opposed side walls being beveled, and the beveled ends of this section being formed with oppositely disposed notches which when brought together provide an opening for insertion of implement for disengaging the beveled ends.

6. A demountable automobile rim comprising a pair of telescopically engaged flanged sections, one of said sections being endless and the remaining section being transversely split and self-contractible, the split ends being beveled for engagement with one another, said endless rim section being equipped with a valve receiving notch and adjacent the same with a rotary fastener including a head having its ends beveled, said head also having a kerf, said section being also equipped with a plurality of circumferentially spaced inwardly extending tongues, the remaining rim section being formed with a plurality of circumferentially spaced elongated slots for co-action with said tongues, and one of the slots adjacent the split being adapted to accommodate the head of the aforesaid rotary fastener, said slot being widened intermediate its ends to permit the head to be turned crosswise in the same and having its opposed walls beveled for co-action with the beveled surfaces of the head, and the beveled ends of the split rim section being formed with oppositely disposed notches which when brought together provide an opening for insertion of a screw-driver or the like for disengaging the beveled ends.

In testimony whereof I have hereunto set my hand.

WALTER E. BEEMAN.